(12) United States Patent
Gagnon et al.

(10) Patent No.: US 6,626,260 B2
(45) Date of Patent: Sep. 30, 2003

(54) ALL TERRAIN VEHICLE

(75) Inventors: Claude Gagnon, Magog (CA); John Gale, Deauville (CA); Paul Deutschman, Westmount (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/949,038

(22) Filed: Sep. 10, 2001

(65) Prior Publication Data

US 2002/0040822 A1 Apr. 11, 2002

Related U.S. Application Data

(63) Continuation-in-part of application No. 09/057,652, filed on Apr. 9, 1998, now Pat. No. 6,523,634.
(60) Provisional application No. 60/231,329, filed on Sep. 8, 2000.

(51) Int. Cl.[7] .............................. B60K 17/22; B62K 5/00
(52) U.S. Cl. ....................... 180/291; 180/215; 180/233; 180/908
(58) Field of Search .................................. 180/210–217, 180/219, 248, 908, 233, 89.17, 291; 280/830, 834, 835

(56) References Cited

U.S. PATENT DOCUMENTS

| | | | | |
|---|---|---|---|---|
| 3,893,533 A | * | 7/1975 | Tidwell | 180/21 |
| 4,535,869 A | * | 8/1985 | Tsutsumikoshi et al. | 180/311 |
| 4,596,301 A | * | 6/1986 | Nagashima | 180/215 |
| 4,650,029 A | * | 3/1987 | Foote et al. | 180/248 |
| 4,650,210 A | * | 3/1987 | Hirose | 180/215 |
| 4,666,015 A | * | 5/1987 | Matsuda et al. | 180/233 |
| 4,744,432 A | * | 5/1988 | Shibata et al. | 180/68.1 |
| 4,836,324 A | * | 6/1989 | Morita et al. | 180/291 |
| 5,076,387 A | * | 12/1991 | Oka | 180/215 |
| 6,182,784 B1 | * | 2/2001 | Pestotnik | 180/376 |

FOREIGN PATENT DOCUMENTS

CA      2202330      10/1998

* cited by examiner

*Primary Examiner*—Anne Marie Boehler
(74) *Attorney, Agent, or Firm*—Pillsbury Winthrop LLP

(57) ABSTRACT

A straddle-type vehicle has configurations in which the engine is located more towards the rear of the vehicle and the fuel tank extends generally vertically beneath the steering member. A radiator may also be located at a rear portion of the vehicle, rearwardly of the engine. A front storage compartment s also provided in the front portion of the vehicle. The resulting vehicle has improved access and storage capabilities and also has a lower center of gravity. The engine may be a four stroke engine, which is more environmentally friendly than a two stroke engine. Because of the increased space requirements of a four stroke engine, a secondary portion of the engine is provided forward of the seat to define an uppermost portion that defines a bottom portion of an access area that the user uses to mount and dismount the vehicle.

44 Claims, 15 Drawing Sheets

ALL TERRAIN VEHICLE

This application is a continuation-in-part of U.S. patent application Ser. No. 09/057,652, which was filed on Apr. 9, 1998 now U.S. Pat. No. 6,523,634. This application claims priority under 35 U.S.C. §119(e) to Provisional Application Serial No. 60/231,329, filed Sep. 8, 2000 the entirety of which is incorporated by reference herein.

BACKGROUND OF THE INVENTION

1. Field of the Invention

The present invention relates to the field of all terrain vehicles. More particularly, the invention relates to a straddle type vehicle comprising improved features.

2. Description of Prior Art

During the last decade or so, the popularity of all terrain vehicles (also referred to as "ATV's") has greatly increased. These types of vehicles are indeed very practical and versatile as they may be used for work, or leisure related tasks. By virtue of their relatively compact nature, their great mobility and traction, they are capable of circulating in all sorts of surfaces, from the common back yard to the more challenging wood trail. Since they are also fairly powerful, all terrain vehicles are also used to pull or push various objects such as a trailer or a snow-plow.

Initially, these types of vehicles comprised a steerable front wheel and two driving rear wheels connected to an engine. Such three-wheeled vehicles were unstable and could overturn. In order to increase stability, the three-wheel base was therefore changed to a four-wheel base.

FIG. 1 illustrates an embodiment of a straddle type vehicle typically found in the prior art. Such a vehicle comprises four wheels mounted to a frame, the front ones being steerable. A fuel tank and a seat are disposed on an upper portion of the frame. The engine, which represents one of the heaviest components of the vehicle, is typically mounted in a central portion of the vehicle, usually below the fuel tank and a front portion of the seat. The engine location is specifically chosen to ensure a proper weight distribution. If the engine is water cooled, a radiator will be provided in front of the engine. Examples of such vehicles are described in more detail in U.S. Pat. No. 4,757,872, issued on Jul. 19, 1988, and naming Inomata as inventor and in U.S. Pat. No. 5,515,940, issued on May 14, 1996 and naming Shichinohe et al. as inventors.

While such a configuration provides vehicles with performance levels that are more than adequate, there are nonetheless many disadvantages associated with it.

In order to sit properly and drive astride, the user must "mount" the vehicle, i.e., he or she must raise one leg over the fuel tank, seat or rear portion of the vehicle in order to sit on or get off the vehicle. Thus, one of the main disadvantages is that access to and from the vehicle can be somewhat challenging. Because of this, some persons tend to drive while assuming a "side-saddle" position and changing gears using a rope tied to the gear lever. This is impractical.

Another inconvenience associated with the location of the fuel tank is that it renders engine access more difficult since there is little space between the cylinder head of the engine and the tank. This is impractical during repair since the fuel tank must be removed. Since the fuel tank is also a relatively heavy component and since it is located on the upper portion of the frame, the above-mentioned configuration also has the disadvantage of creating a relatively high center of gravity.

The location of the radiator in front of the engine also has various disadvantages. Since, during normal use, the vehicle travels mostly in the forward direction, the front-located radiator is more exposed to the possibility of being pierced by a branch or the like or being obstructed by mud. In order to compensate for this, it may be possible to cover the radiator with a protective member, but this reduces the amount of air reaching the radiator thereby reducing its cooling efficiency. This location of the radiator is also an ineffective use of valuable space. Another disadvantage of the prior art ATV shown in FIG. 1 is that the engine may be a two stroke engine, which has higher emissions levels as compared to four stroke engines. However, a four stroke engine is larger than a two stroke engine, and it therefore becomes a difficulty to adapt the ATV to accommodate a four stroke engine. The configuration referred to above also leaves very little room to accommodate storage compartments or additional accessories, especially in the front portion of the vehicle.

SUMMARY OF THE INVENTION

It is therefore an aspect of the present invention to provide a straddle-type vehicle having an improved frame and improved access features.

It is a further aspect of the present invention to provide a straddle-type vehicle having a relatively low center of gravity.

It is yet another aspect of the present invention to provide a vehicle having improved storage capabilities.

It is still another aspect of the present invention to provide an ATV having a four stroke engine that has low emissions. Even though the four stroke engine is larger than a two stroke engine, it is possible to use it while at the same time providing improved access for servicing the engine and/or for mounting the ATV.

It is yet another aspect of the present invention to provide an ATV that is arranged to allow easier mounting and dismounting therefrom.

As embodied and broadly described herein, a first preferred embodiment of the invention provides a straddle-type vehicle having a frame, a pair of front wheels suspended from a front portion of the frame, a pair of rear wheels suspended from a rear portion of the frame, a power unit mounted on the frame, a transmission allowing the power unit to transmit power to at least one of the front or rear pairs of wheels, a seat located in between the front and rear pairs of wheels, wherein a first portion of the power unit is disposed beneath the seat and a second portion of the power unit is disposed forward of the seat and below a horizontal plane defined by an uppermost portion of the seat.

In a preferred embodiment, a main portion of the transmission is also disposed beneath the seat and the power unit comprises a crankshaft and a transmission shaft extending in a running direction of the vehicle, and a rear drive shaft is connected to a rear end of the transmission shaft on one end and to a rear differential on the other end to allow the power unit to transmit power to the pair of rear wheels.

In the context of the present specification, the term "differential" should be interpreted as meaning any type of device that is capable of imparting a rotational movement to a pair of wheels from a driving shaft, whether or not it permits one wheel to revolve faster than the other one. This includes any type of gearing such as ring and pinion gearing, spiral gearing, hypoid gearing, worm gearing or the like. This also includes any types of viscous coupling.

In another preferred embodiment, the vehicle comprises a front drive shaft connected to a front end of the transmission shaft on one end and to a front differential on the other end to allow the power unit to transmit power to the pair of front wheels.

In another embodiment the power is transmitted to at least one of the front or rear pairs of wheels through a drive chain and sprocket arrangement.

In a preferred variant, the seat is pivotably connected to the frame, the seat being moveable between a first position whereby the driver may drive the vehicle and a second position whereby the driver may access the power unit. The seat preferably comprises a pommel located at a front portion thereof and is most preferably removably connected to the frame.

Other aspects and features of the invention will become apparent by reference to the following specification and to the drawings.

BRIEF DESCRIPTION OF THE DRAWINGS

The following is a description by way of preferred embodiments, reference being made to the following drawings, in which.

DETAILED DESCRIPTION OF PREFERRED EMBODIMENTS

Figure 1:
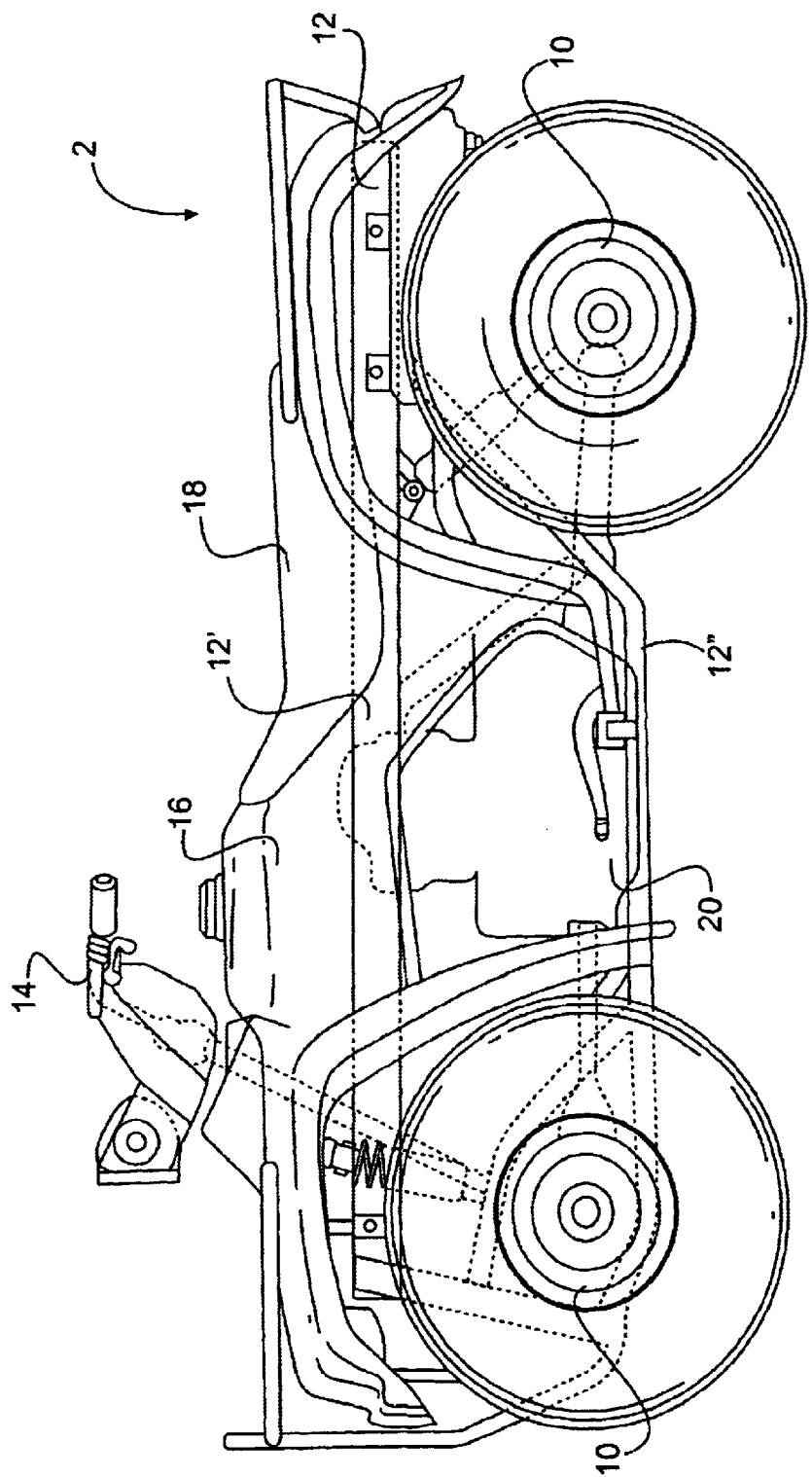
FIG. 1 is a side view of a straddle-type vehicle according to the prior art.

FIG. 1 illustrates a straddle-type vehicle 2 conventionally found in the prior art. Such a vehicle comprises front and rear wheels 10 mounted to a frame 12, the front wheels being steerable through a steering member 14 connected to a steering mechanism (not shown). The frame 12 comprises upper members 12' extending on an upper portion of the vehicle above the power unit and lower members 12" extending on a lower portion thereof. A fuel tank 16 and a seat 18 are disposed on an upper portion of the frame 12. The power unit 20, which represents one of the heaviest components of the vehicle, is typically mounted in a central portion of the vehicle, usually below the fuel tank 16 and a front portion of the seat 18. If the power unit is a water cooled engine, a radiator will be provided in front of the engine.

Figure 2:
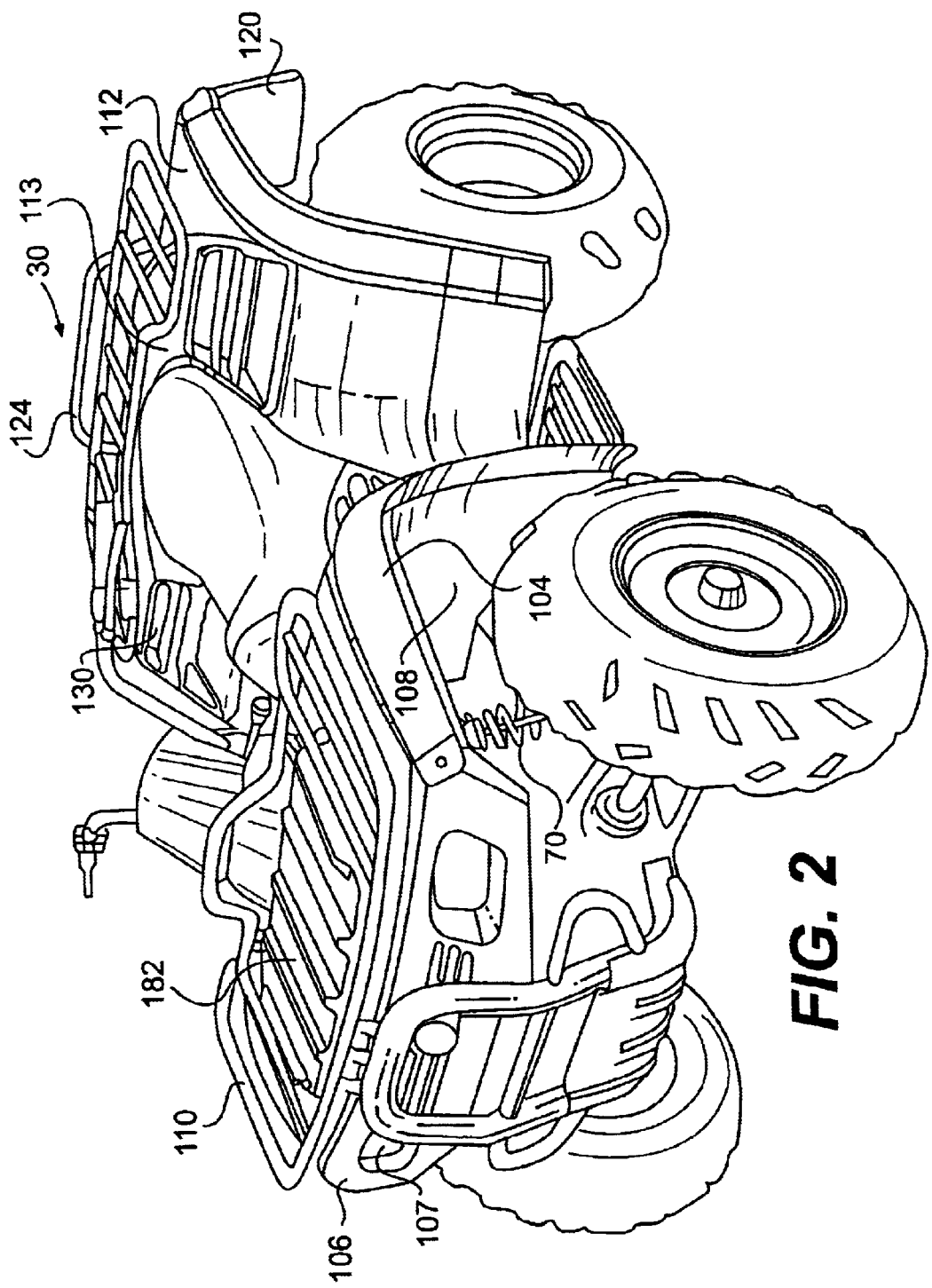
FIG. 2 is a perspective view of a straddle-type vehicle according to the present invention.

A preferred embodiment of a straddle-type vehicle according to the present invention is generally illustrated in FIG. 2 and described in further detail below.

Figure 3:
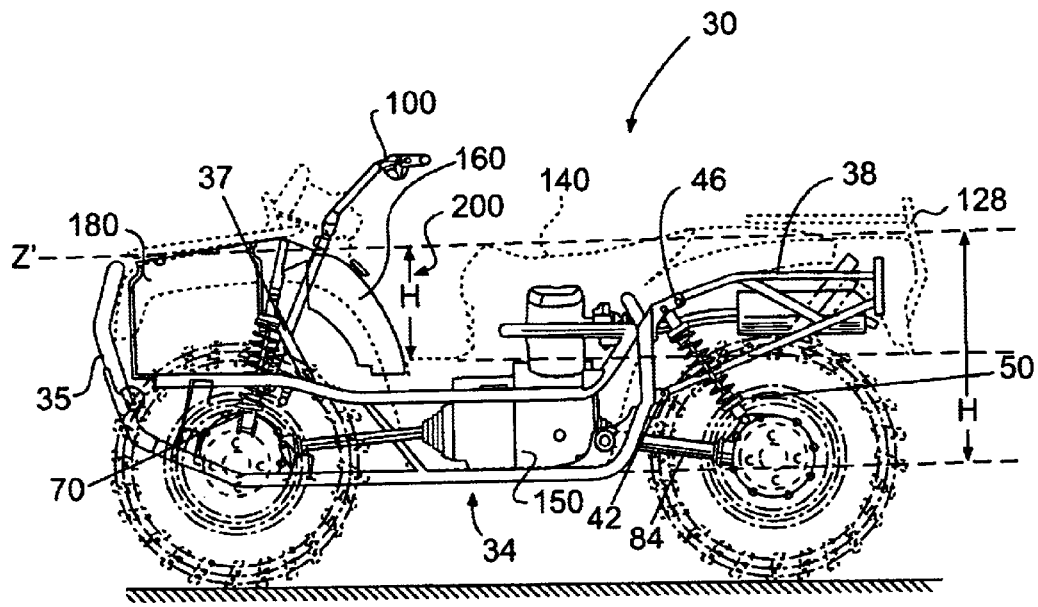
FIG. 3 is a side view of a vehicle according to the present invention illustrating more particularly the frame and the power transmission system.
Figure 4:
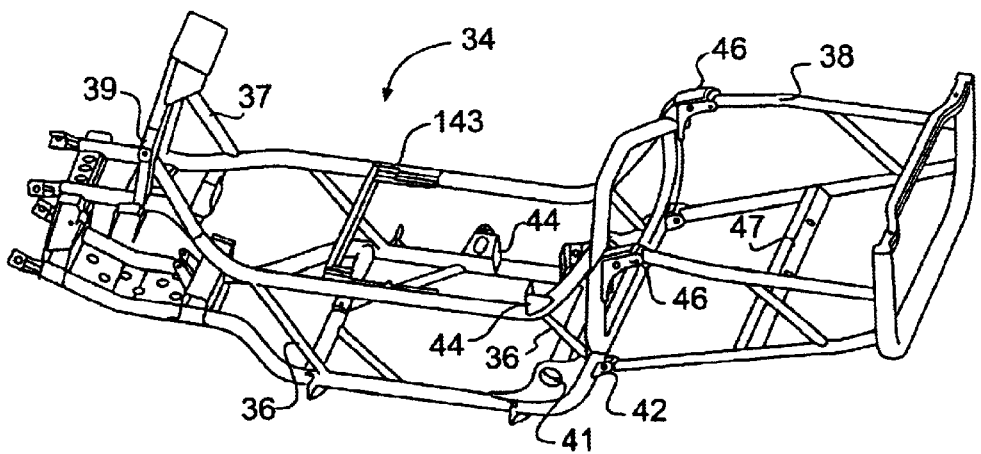
FIG. 4 is a perspective view of a frame.

Referring now to FIGS. 3 and 4, the vehicle, generally referred to at 30, comprises a main frame portion 34 and a secondary frame portion 38 that is attached to the main frame portion 34 at attachment points which may comprise mounting brackets 42, 46. A front area of the main frame portion 34 comprises all attachments necessary to receive and accommodate upper and lower front suspension arms, a front differential, steering linkage and other typical components including a front bumper 35. The rear area of the main frame portion 34 extends upwardly and terminates by the upper brackets 46 and the lower brackets 42. The main frame portion 34 also comprises openings 41 for pivotally attaching rear swing arms as described below and brackets 44 for mounting the power unit. The upper and lower brackets 46 and 42 are used to attach the secondary frame portion 38 to the main frame portion 34 as explained before. The upper brackets 46 are also used to receive and attach the upper end of rear shock absorbers 50 to the main frame portion 34. Both the main and secondary frame portions 34, 38 may comprise tubular, stamped, or hydroformed members interconnected in a conventional manner, such as by welding or by mechanical fasteners.

Figure 4A:
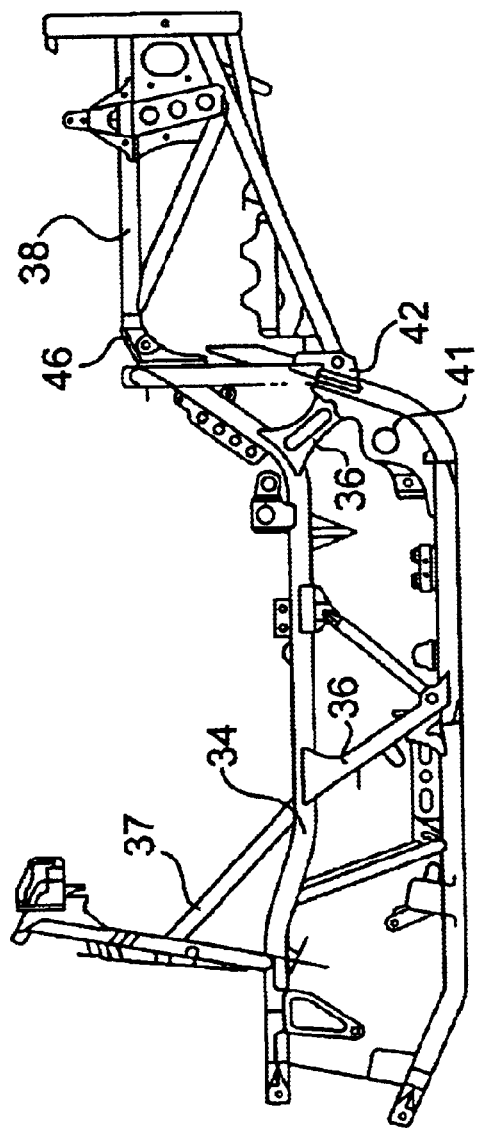
FIG. 4A is a side view of the frame shown in FIG. 4.

The provision of the main and secondary frame portions 34, 38 in this particular embodiment provides various advantages. First, it may be more efficient on an assembly line to manufacture a frame in two parts rather than as a single component when using conventional tooling due to the cumbersome nature of moving one large frame unit. In contrast with the vehicles of the prior art, the main frame portion 34 of the vehicle of the present invention includes upper members 57 that are located below an upper portion of a power unit 50. Due to the relatively narrower spacing between upper and lower members of the main frame portion 34 as compared to the frames (e.g., 12) of the prior art vehicles, stress on the upper and lower members may be relatively greater. As a result, the main frame portion may be manufactured from a material having a higher creep resistance or by using larger members. Reinforcement members, such as 36 and 37 (FIG. 4A) may also be provided to assist the main frame portion 34 in maintaining its structural integrity. Since the main frame portion 34 is intended to accommodate the majority of the stress imparted to the vehicle, the secondary frame portion 38 may be manufactured using a smaller structure or from a less expensive material. Apart from reducing costs, such an embodiment also has the advantage of providing a lighter vehicle. It is, of course, possible that a unitary frame structure may be used as well.

A pair of front wheels comprising a first wheel 58 and a second wheel 60 is suspended from a front area of the main frame portion 34. More particularly, the vehicle comprises upper suspension arms 64 (FIG. 5) and lower suspension arms (not shown) that are pivotally attached to the main frame portion 34 at one end and to a steering knuckle via ball joints at the other end. The steering knuckles each comprise a spindle adapted to receive a wheel and its bearings. The steering knuckles are connected to a steering member 100 (FIG. 3) through a conventional steering linkage or mechanism so as to provide steerable front wheels. A pair of front shock absorbers/coil spring assemblies 70 (FIG. 2) connected to the frame at bracket 39 (FIG. 4) at one end and to the upper suspension arms 64 at the other end are also provided.

If the vehicle is intended to be of the four wheel drive type, power is transmitted from the power unit 150 to the front wheels 58, 60 through a conventional mechanism comprising front axles 68 and a front differential 72 that is coupled to the power unit 150 via a front drive shaft 76. The front drive shaft 76 may include a universal joint at each end thereof to allow for angular displacement of the drive shaft 76.

A pair of rear wheels comprising a third wheel 80 and a fourth wheel 82 is suspended from the rear area of the main frame portion 34. More particularly, the vehicle comprises rear swing arms (not shown) that are pivotally connected to the main frame portion 34 at one end and to a rear axle casing 86 at the other end. A pair of rear shock absorbers/coil spring assemblies 50 (FIG. 3) connected to the main frame portion 34 on one end and to the rear axle casing 86 on the other end are also provided. Alternatively, a single shock absorber/coil spring assembly could be used at the rear, provided it is located in a generally medial location.

Power is transmitted from the power unit 150 to the rear wheels 80, 82 through a conventional mechanism comprising a rear differential 90 that is coupled to a rear drive shaft 94 at one end and to a rear axle located in rear axle casing 86 at the other end. In one particular embodiment, one of the rear swing arms may serve as a housing for the rear drive shaft 94. In order to accommodate the angular movement of the rear swing arm, a universal joint is provided at each end of the drive shaft 94.

While the preferred embodiment has been described using drive shafts to transmit power from the power unit 150 to the front or rear pairs of wheels, other types of power transmission means may be provided. For example, the drive shafts could be replaced by suitable drive chain and sprocket arrangement.

Figure 14:
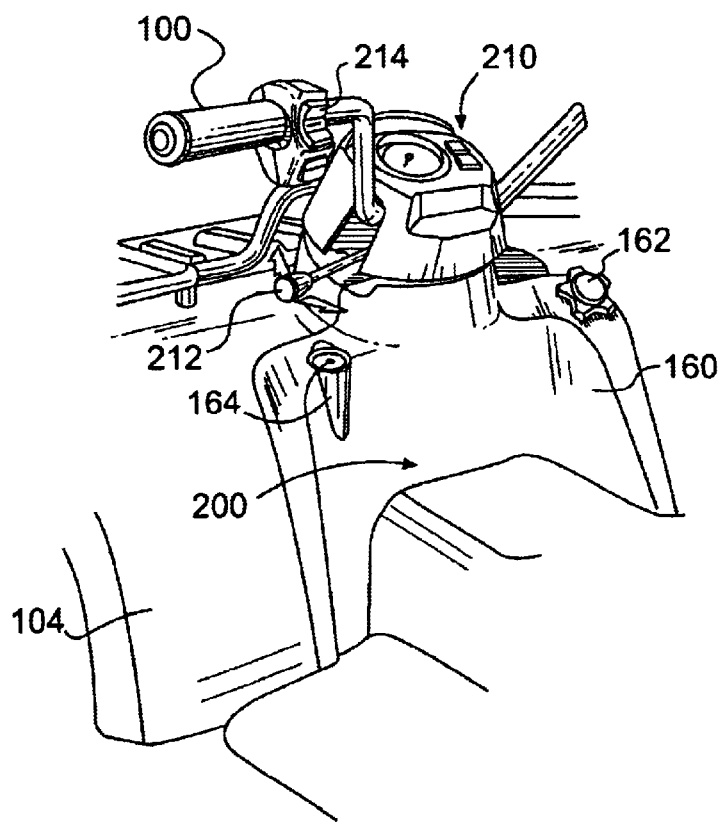
FIG. 14 is a perspective partial view of the steering member, instrumentation panel and fuel tank.

As shown more particularly in FIG. 14, an instrument board 210 is provided on the steering member 100 and comprises the usual indicators such as speedometer, odometer, indicator lights, etc. A device for electrically shifting gears 214 may also be provided if the vehicle is equipped with a semi-automatic transmission. A main gear lever 212, for selectively engaging either one of a Park, Neutral, High, Low or Reverse position may be located near the steering linkage.

The vehicle is also provided with a conventional braking mechanism which may comprise disk or drum brakes. The brakes may be hydraulically or mechanically activated.

Figure 6:
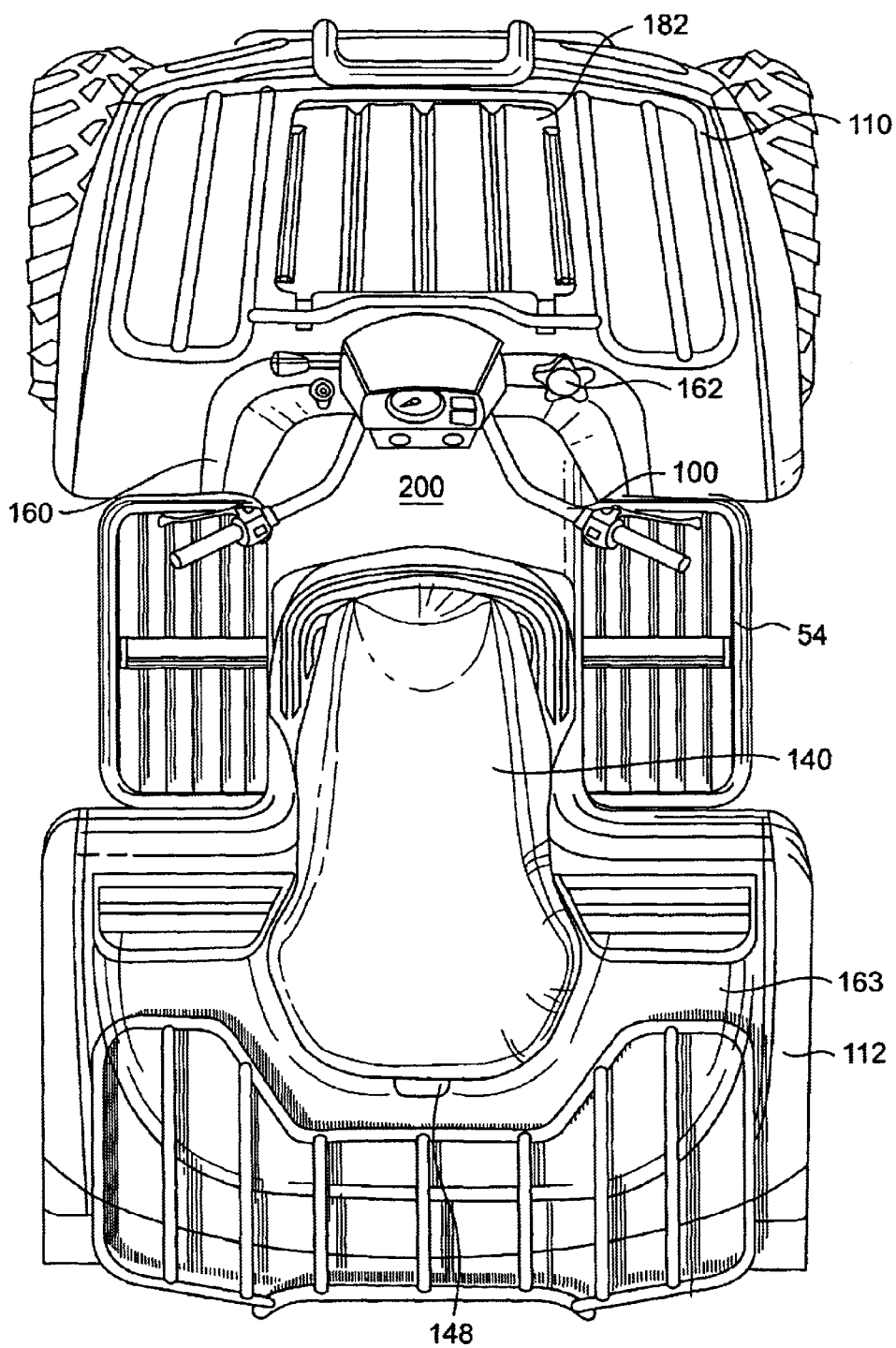
FIG. 6 is a top plan view of a vehicle according to the present invention.
Figure 7:
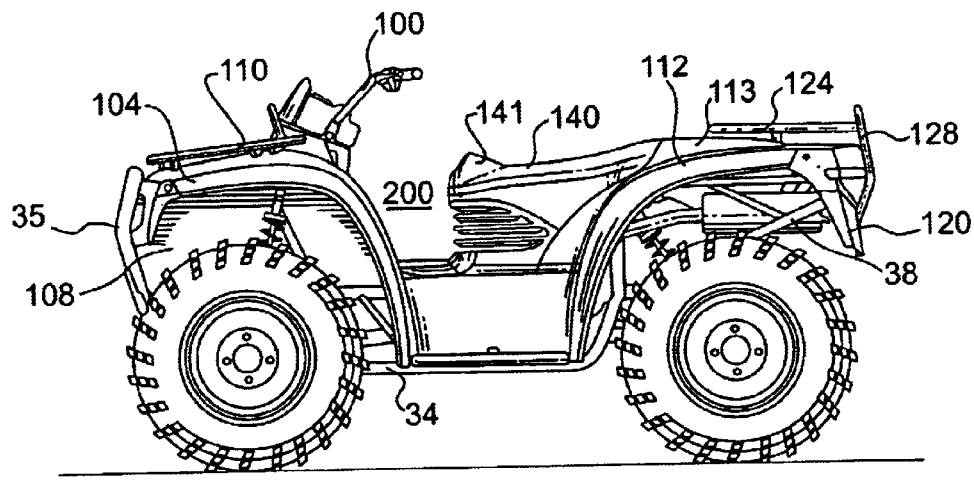
FIG. 7 is a side view of the vehicle illustrated in FIG. 2.
Figure 10:
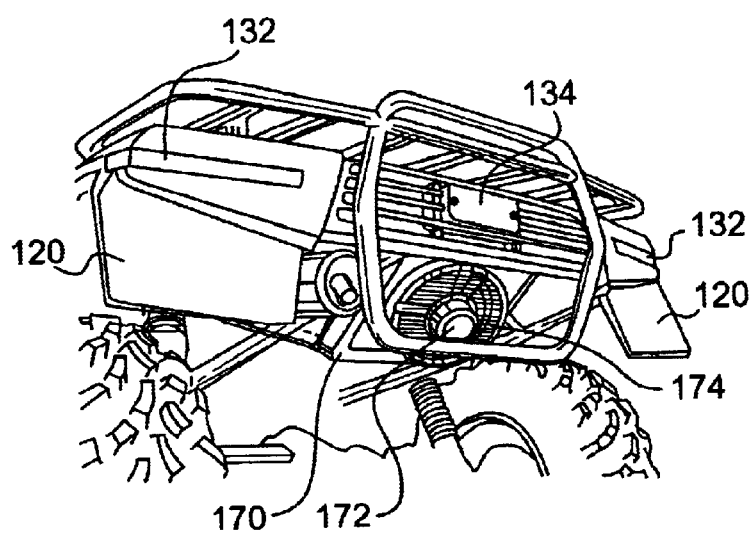
FIG. 10 is a perspective view of a rear portion of a vehicle according to the present invention illustrating the position of the radiator.

As shown more particularly in FIGS. 2, 6 and 7, the vehicle also comprises front fenders 104 attached to the frame and defining front wheelhouses 108. The front portion of the vehicle also includes a front grille 106 and headlamps 107 and may comprise a front rack 110. A front storage compartment 180 (FIG. 3) is also provided at the front portion of the vehicle, in front of the steering member 100. Rear fenders 112 are also attached to the frame. The rear fenders may also comprise splash guards 120 and a rear rack 124. As shown more particularly in FIG. 10, the rear portion of the vehicle may also comprise reflective tapes 132 and a rear lamp 134. The rear fenders also comprise ventilation openings 130 (FIGS. 11 and 12), the purpose of which will be described hereinafter. Front and rear bumpers 35 and 128 are also respectively secured to the main and secondary frame portions 34 and 38.

Full foot rests 54 (FIG. 6) may also be provided on each side of the vehicle, in between the front and rear fenders. The foot rests 54 may accommodate a gear shift lever (if the vehicle does not have an electrically controlled transmission) and brake lever (not shown). The provision of full foot rests provides increased comfort in contrast with the typical foot peg since the weight is distributed over the entire bottom surface of the foot.

A straddle-type seat 140 is also removably secured to the frame using generally U-shaped brackets 142 (FIGS. 8 and 9) or 143 (FIG. 4) that are securely fixed to the frame. As shown in FIG. 9, the seat comprises a base portion 146 made from a suitable material such as plastic. The base portion 146 is shaped so as to surround and enclose the power unit 150 thereby enhancing the aesthetics of the vehicle when the seat is in a closed position as shown in FIG. 7. The upper portion of the seat 140 is provided with a suitable padding material and a pommel 141 is disposed at a front portion thereof to improve comfort. A support member 144 is secured to the base 146 and is adapted to engage bracket 142 or 143 to secure the seat in place. A locking device 148 (FIG. 8) maintains the seat in a closed position wherein the driver may drive the vehicle.

Figure 8:
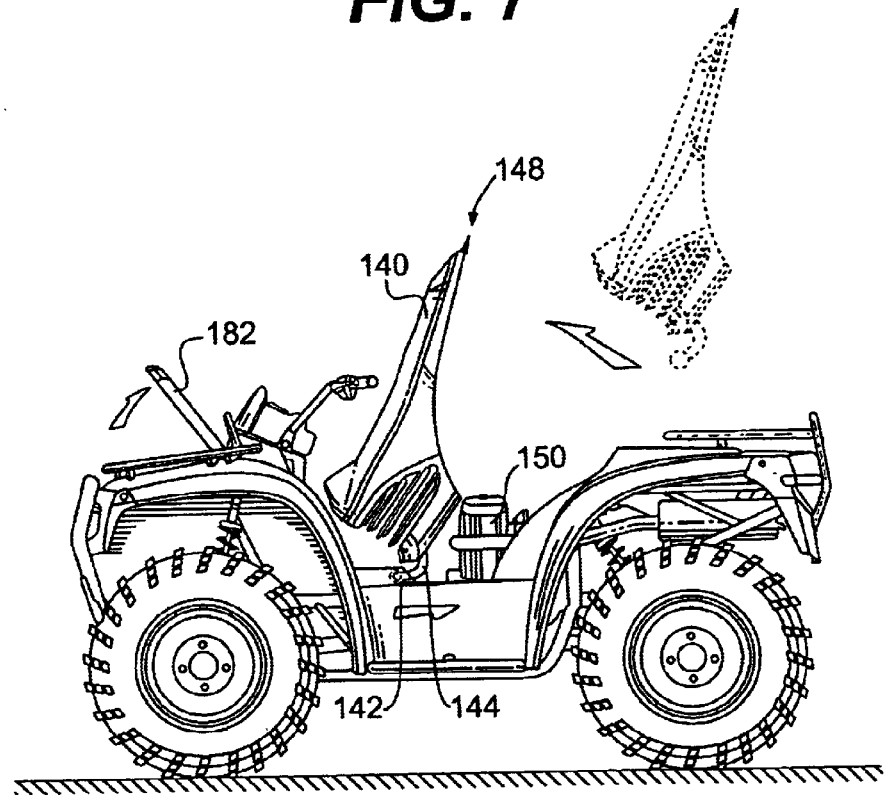
FIG. 8 is a side view illustrating the front hatch in an open position and the seat in an engine access position.
Figure 9:
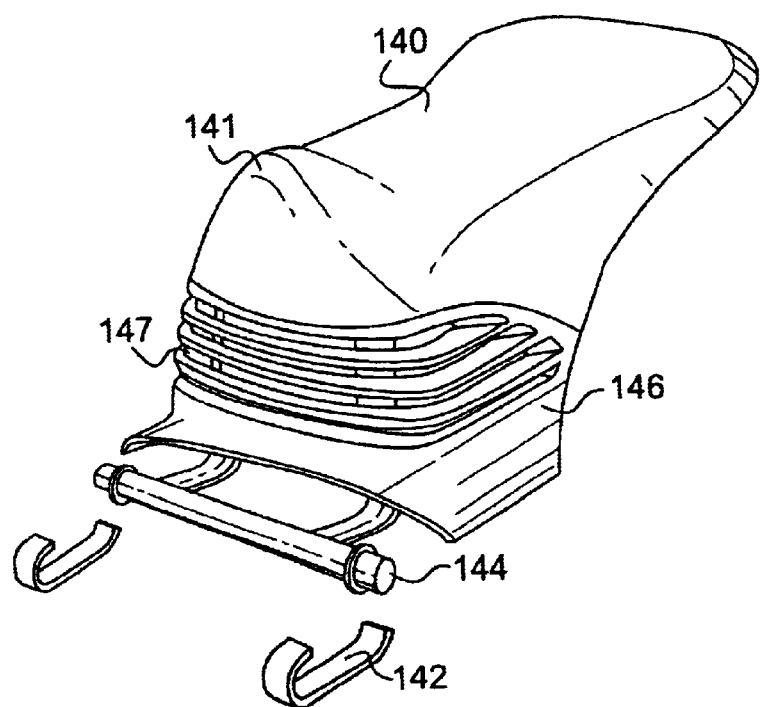
FIG. 9 is a perspective view of a seat and mounting brackets thereof.

As shown in FIG. 8, the engine compartment of the vehicle is readily accessible by simply pivoting and/or removing the seat. In order to remove the seat, the user unlocks the locking device 148, pivots the seat upwardly and thereafter slides the seat rearwardly until the support member 144 clears the upper portions of the brackets 142 or 143.

Figure 16:
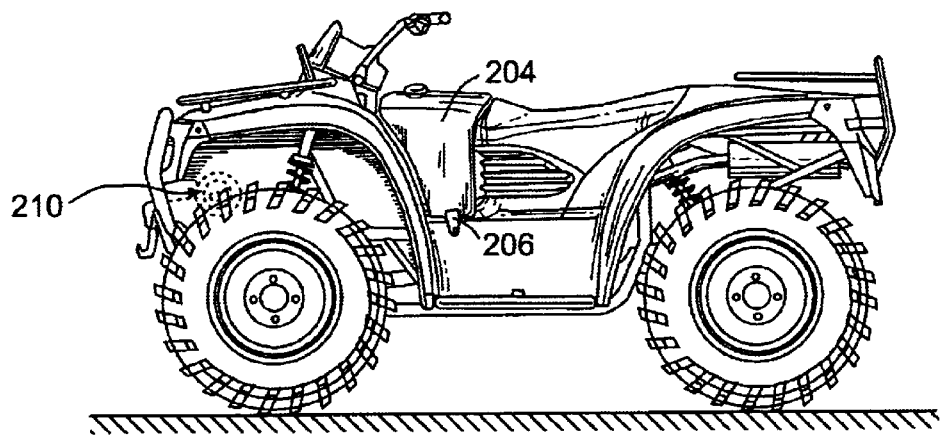
FIGS. 16 and 17 are side views of a vehicle according to the present invention comprising an additional container.
Figure 17:
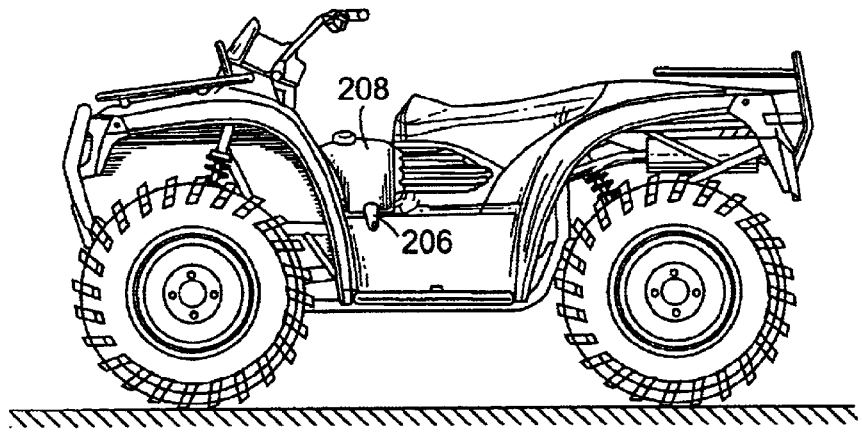

Since the power unit is enclosed beneath the seat 140, ventilation openings 147 are preferably provided in the base portion 146 of the seat in order to ensure proper ventilation of the engine compartment. The ventilation openings 147 preferably also extend to the side of the seat since accessories, which would block the openings, may be provided in front of the base portion of the seat as shown in FIGS. 16 and 17.

A suitable type of power unit for use in the context of the present invention is preferably capable of simultaneously driving the front and rear wheels, although rear or front wheel drive vehicles may also be contemplated. A preferred type of power unit includes an engine and a transmission integrally joined to one another. As discussed previously, power is provided to rear and/or front wheels via respective drive shafts (e.g., drive shafts 76, 94) and differentials (e.g., differentials 72, 90). It is contemplated that a preferred transmission for a four-wheel drive vehicle may include a pair of parallel transmission shafts, which are interconnected by gears and connected to respective drive shafts. The power unit comprises all the necessary components such as a carburetor 152, an exhaust pipe 154, a muffler 156, an air filter 158 having an air intake, and a battery 161 (FIG. 5).

In contrast with the prior art, where the power unit is mounted in a central portion of the vehicle, the power unit of the vehicle of the present invention is mounted more towards the rear portion of the vehicle.

Figure 5:
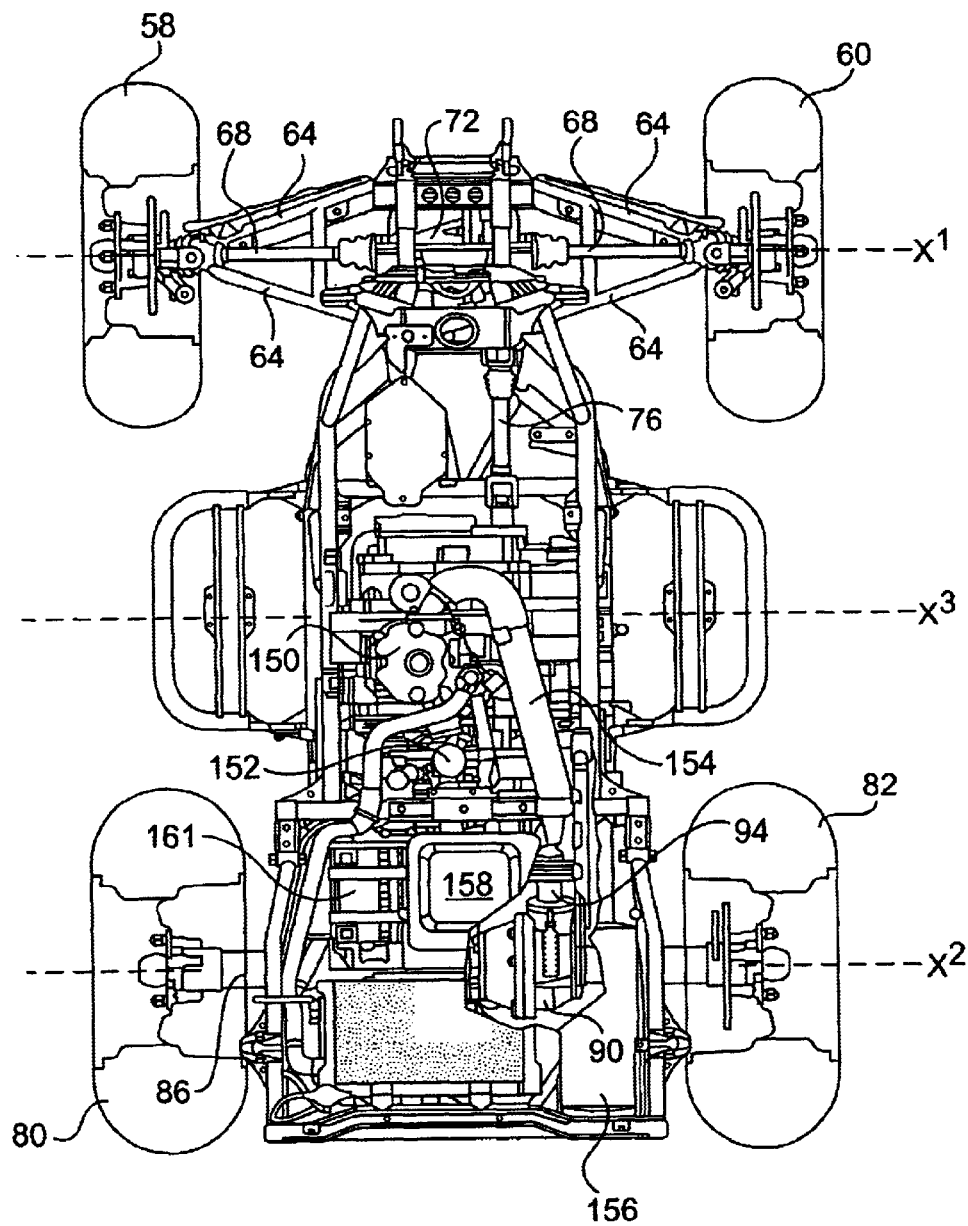
FIG. 5 is a top plan view of a vehicle according to the present invention illustrating more particularly the frame and the power transmission system.

In a first preferred embodiment shown in FIG. 5, the position of the power unit may be defined in relation to various transverse axes. More specifically, the location of the power unit 150 may be defined in relation to an axis $x^3$ that is medially located between a first transverse axis $x^1$ defined by the front wheels 58 and 60 and a second transverse axis $x^2$ defined by the rear wheels 80 and 82. More particularly, in this embodiment, a main portion of the power unit is located between the medial axis $x^3$ and the second axis $x^2$.

If, in another embodiment, the vehicle is provided with two pairs of rear wheels, for a total of six wheels, the second axis $x^2$ will be defined by the forwardmost pair of rear wheels.

In another embodiment, the location of the power unit may be defined in relation to the seat. Thus, as shown in FIGS. 3 and 8 and in contrast with the prior art, the present invention may be characterized by a vehicle in which a main portion of the power unit 150 is disposed generally directly beneath the seat 140.

Another aspect of the invention resides in the location of the fuel tank 160. Since a full fuel tank represents a relatively heavy component of the vehicle, its location is important to ensure proper weight distribution and proper balance of the vehicle. As shown in FIGS. 3, 6 and 14, in one embodiment, the fuel tank 160, which includes a fuel cap 162 and a fuel gauge 164, extends vertically beneath the steering member 100 and more particularly, substantially below the horizontal plane defined by the uppermost portion of the seat 140.

The location of the fuel tank 160 at this specific area provides many benefits. First, by providing the fuel tank 160 that extends in the vertical direction, it is possible to concentrate an important amount of weight in the lower portion of the vehicle thereby lowering its center of gravity.

By moving the fuel tank 160 from an upper portion of the frame to an area located generally beneath the steering member 100, there is provided an open area 200, between the fuel tank 160 and the power unit 150. (See FIG. 7.) This open area 200 facilitates access to and from the vehicle as the driver does not have to raise his leg above the level of the fuel tank 160, seat or rear portion of the vehicle. The open area also provides space to secure additional storage containers. As shown in FIG. 3, a height h defined by a horizontal plane Z' (Z' is generally coextensive with an upper portion of the seat 140) and a lower surface of the area 200 is about 50% of a height H defined between the horizontal plane Z' and a lowermost portion of the main frame portion 34 where the foot rests 54 are positioned.

Some objects of the present invention may be achieved by locating the fuel tank 160 at an area other than beneath the steering member 100. For example, the fuel tank could be located at a front portion of the vehicle, and could surround the steering linkage. The location of the fuel tank will therefore be dictated by balance and security considerations.

If the power unit 150 includes a water-cooled engine, the vehicle may comprise a radiator 170. In a preferred embodiment, the radiator 170 is located behind the engine at the rear area of the secondary frame portion. The radiator 170 may be fixed to the frame by securing it to bracket 47 (FIG. 4). As shown more particularly in FIG. 10, the radiator 170 is preferably inclined forward and upwardly towards the seat 140 of the vehicle and comprises a grille (not shown) and a shroud 174 protecting the grille. A cooling fan 172 is mounted within the shroud in a conventional manner.

The provision of the radiator 170 at the rear portion of the vehicle, rearward of the power unit 150 provides increased protection by limiting its exposure. Since, during normal operation, the vehicle travels mostly in the forward direction, the possibilities of the rearwardly located radiator 170 being pierced by a branch or the like are therefore substantially reduced. The location of the radiator 170 at the rear portion of the vehicle also permits to make a more efficient use of the space in the front portion thereof and provides room to more efficiently locate the fuel tank 160 as explained above.

Figure 11:
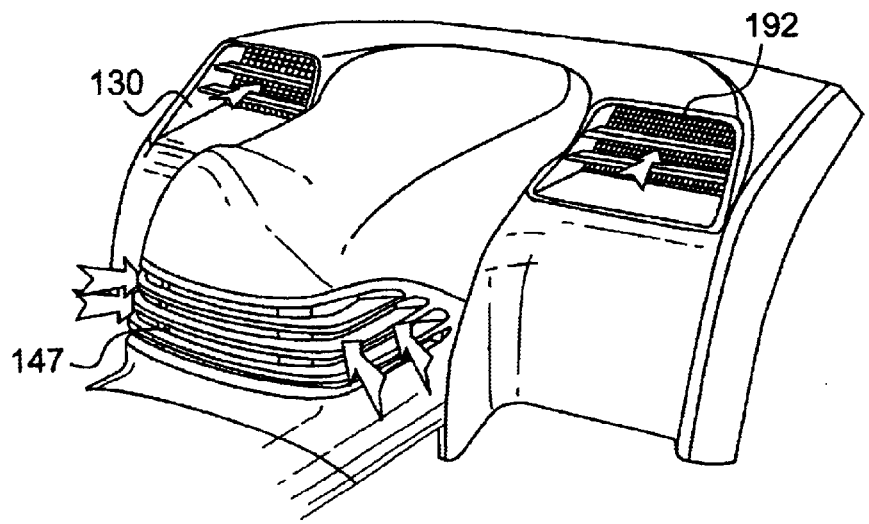
FIG. 11 is a perspective view of a portion of a seat and rear fenders illustrating the ventilation openings.
Figure 12:
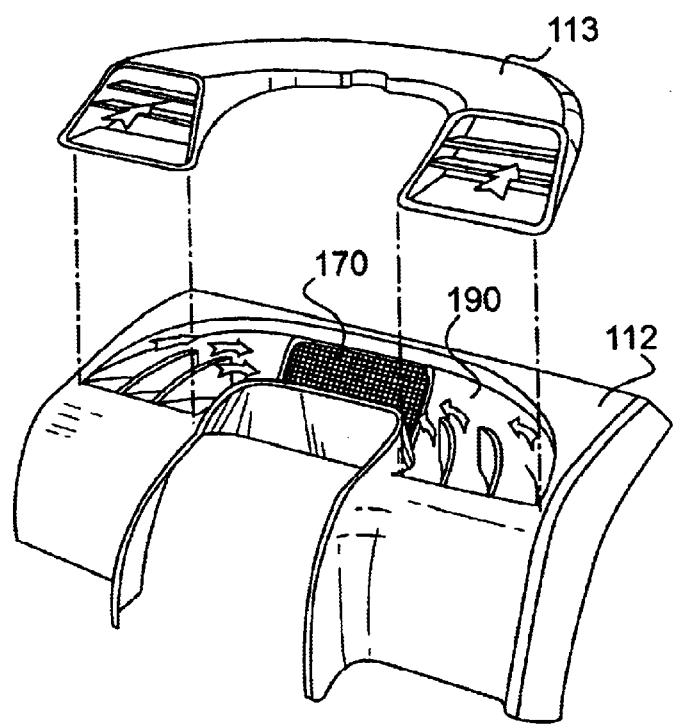
FIG. 12 is an exploded view of the rear fenders and ventilation channels cover.

Referring now to FIGS. 11 and 12, there are provided forward facing ventilation openings 130 for conveying air to the radiator 170. In order to convey the cooling air, ventilating channels 190 are defined within the rear fenders 112 as shown more particularly in FIG. 12. A cover portion 113 covers the channels, and protecting grilles 192 are provided to prevent debris from entering and blocking the ventilating channels.

Figure 13:
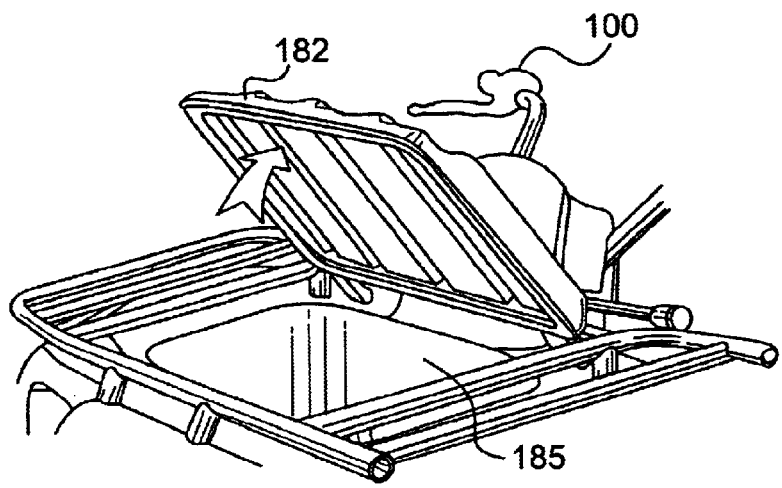
FIG. 13 is a perspective view of a front storage compartment with the hatch in an open position.

By locating the radiator 170 at a rear portion of the vehicle, the amount of space at the front of the vehicle is maximized. In particular, a front storage compartment 180 may be provided at a front portion of the vehicle, forward of the steering member 100 (FIG. 13). The storage compartment 180 includes a hatch 182 that is pivotally secured to the vehicle and that is preferably removable. The front storage compartment 180 may be provided with a waterproof removable container 185 that may be used as a cooler or that may be used as a tank to keep the catch of the day if the user is an avid fisherman, for example. Absent such front storage compartment, the driver would have to secure any objects to the front or rear racks 110 or 124 by using ropes or the like. This is time consuming.

Figure 15:
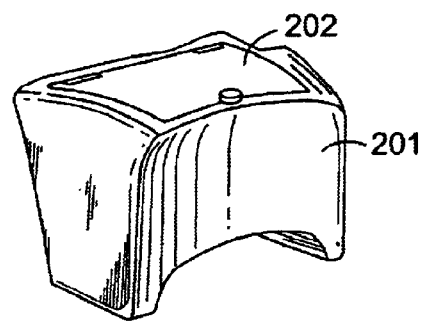
FIG. 15 is a perspective view of an additional storage container.

A plurality of additional storage containers or accessories adapted to be inserted into the open area 200 may be provided. An example of an additional storage container is illustrated in FIG. 15 and comprises a container portion 201 and a hatch 202. FIG. 16 illustrates the possibility of providing an additional fuel tank 204 that is secured to the vehicle via mounting brackets 206. Obviously, this tank will have to respect all applicable security and liability requirements before being installed on the vehicle. Another possible embodiment concerning a smaller tank 208 is shown in FIG. 17.

Other types of accessories, such as a winch 210, may also be provided, preferably within the front portion of the vehicle underneath the storage compartment 180.

FIGS. 18–21 illustrate another preferred embodiment of a straddle-type ATV 300 according to the present invention. The ATV 300 includes a seat 302, a pair of handle bars 303 for steering a pair of front wheels 305, and a pair of front fenders 304 positioned above the front wheels 305. A pair of rear fenders 307 are provided to cover a pair of rear wheels 309.

An open area 306 is positioned between a front portion of the seat 302 and a steering column for the handle bars 303 or a fuel tank 311. The open area 306 is defined between a horizontal plane Z' formed along the uppermost surface of the seat 302 and a cover member 312 that covers a main frame 310 (FIGS. 19 and 20) of the ATV 300. The cover member 312 is preferably formed as an integral unit with the front fenders 304 and/or the rear fenders 307.

Figure 18:
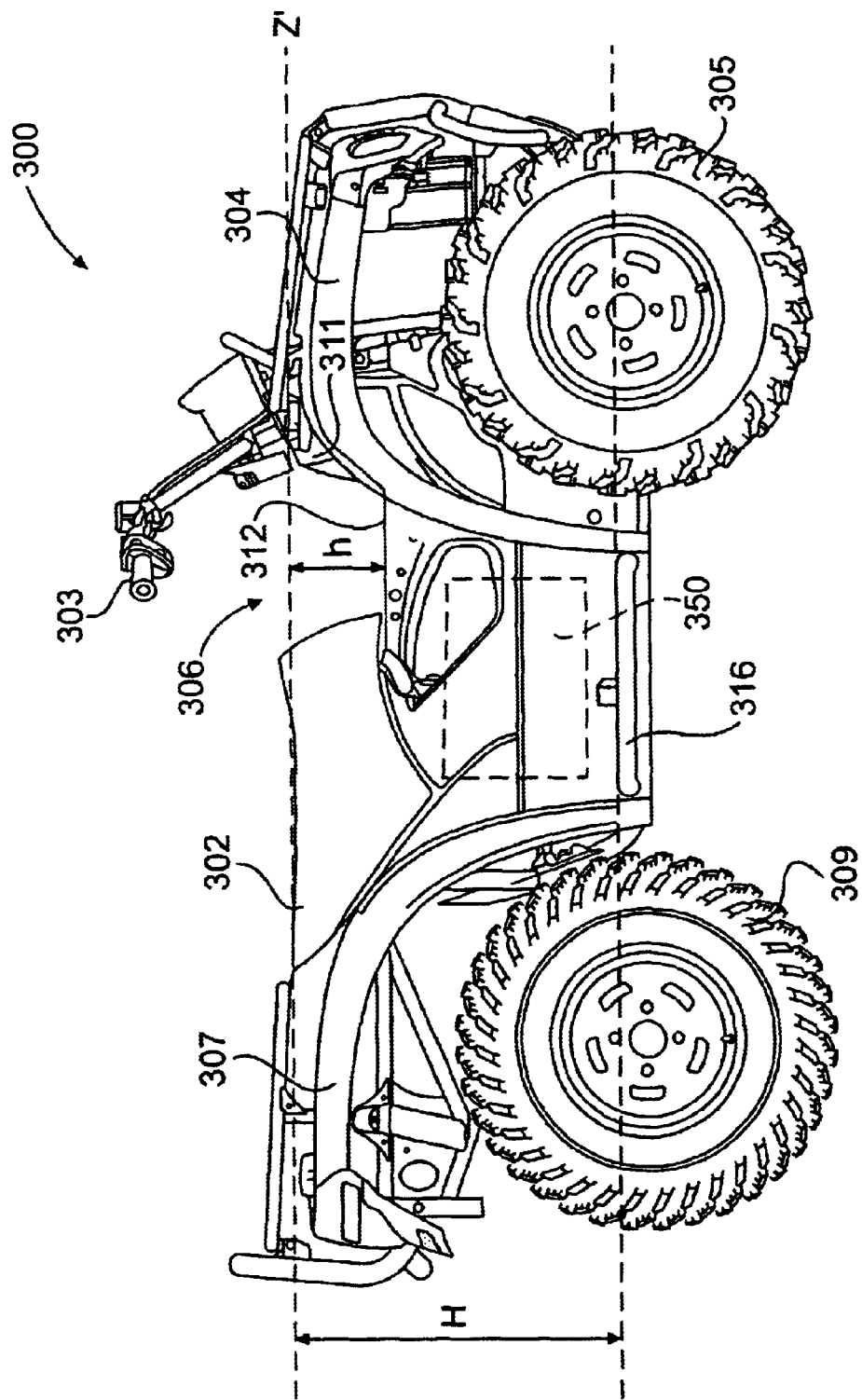
FIG. 18 is a perspective view of a straddle-type vehicle according to another preferred embodiment of the present invention.

In this particular embodiment, a height h defined between the horizontal plane Z', which extends an uppermost portion of the seat 302, and the top of the cover member 312 is no more than about 50% (and preferably between about 25% to about 33%) of a height H defined between the horizontal plane Z' and a plane defined by a foot rest 316 that is connected to the lowermost portion of the frame 310 (FIG. 19) between the front and rear fenders 304, 307. The ratio h:H in the embodiment of FIG. 18 is less than the same ratio h:H in the embodiment shown in FIG. 3, because, for example, a portion of an engine 350 shown in the FIG. 18 embodiment is positioned below the open area 306. Moreover, the engine 350 is larger than the engine 150 shown in FIG. 3. The engine 350 is a four cycle engine, which generally has lower emissions and is more environmentally friendly than the two cycle engine 150 shown in FIG. 3. Thus, the height h of the open area 306 in FIG. 18 is less than the height h shown in FIG. 3 because the engine 350 is larger than the engine 150. It is contemplated that the engine 350 may also be increased in size due to the addition of a continuously variable transmission (CVT), which may be disposed beneath the cover member 312. It is also contemplated that a relatively larger capacity fuel tank 311 may be provided to take advantage of the extra space. The larger fuel tank 311 may be used in addition, or in lieu of the larger engine, or an engine used with a CVT. The reduced height of the open area 306 also has the effect of providing a more sturdy appearance as compared to the embodiment of FIG. 3.

Figure 19:
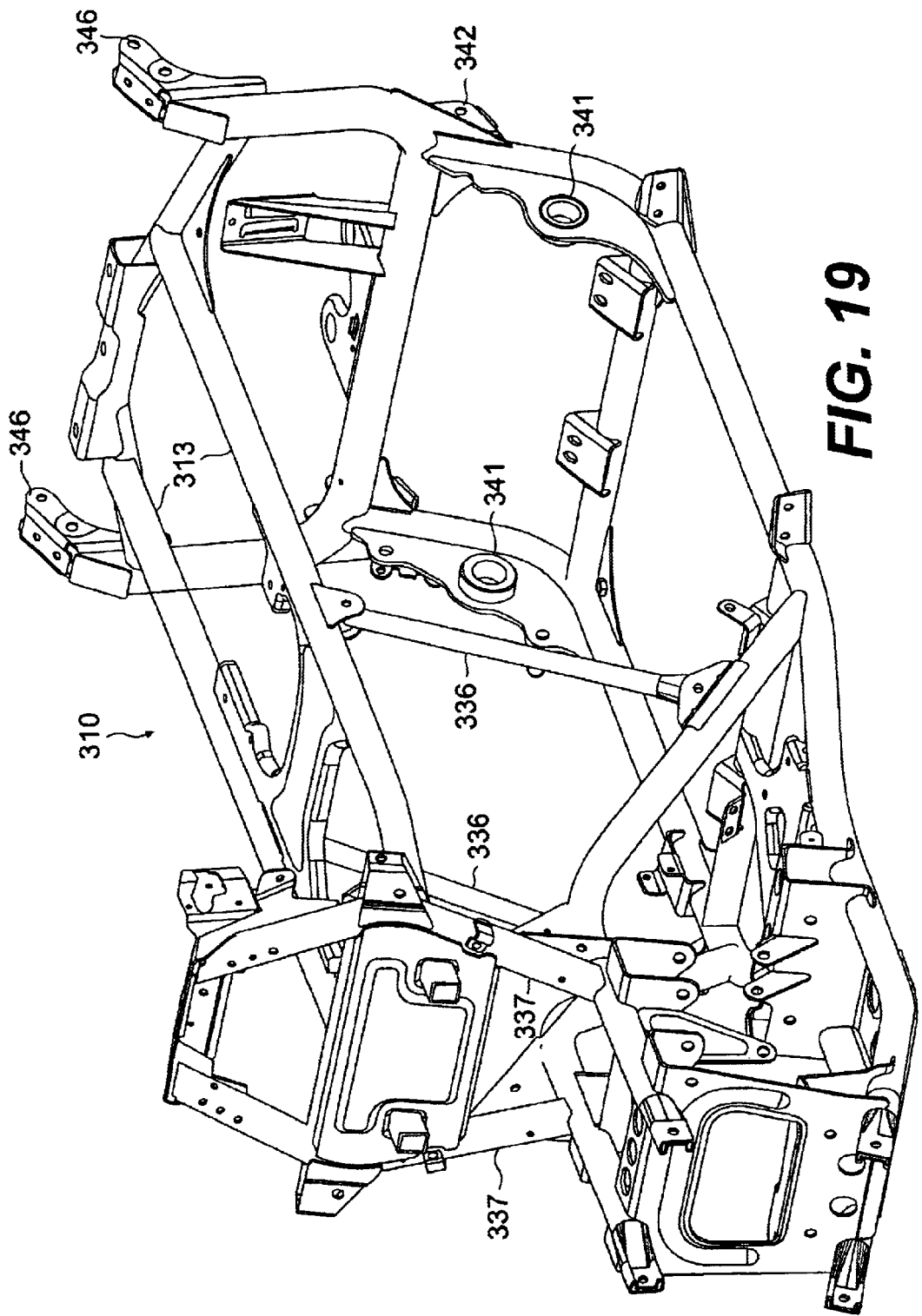
FIG. 19 is a perspective view of a frame for use in the straddle-type vehicle of FIG. 18.
Figure 20:
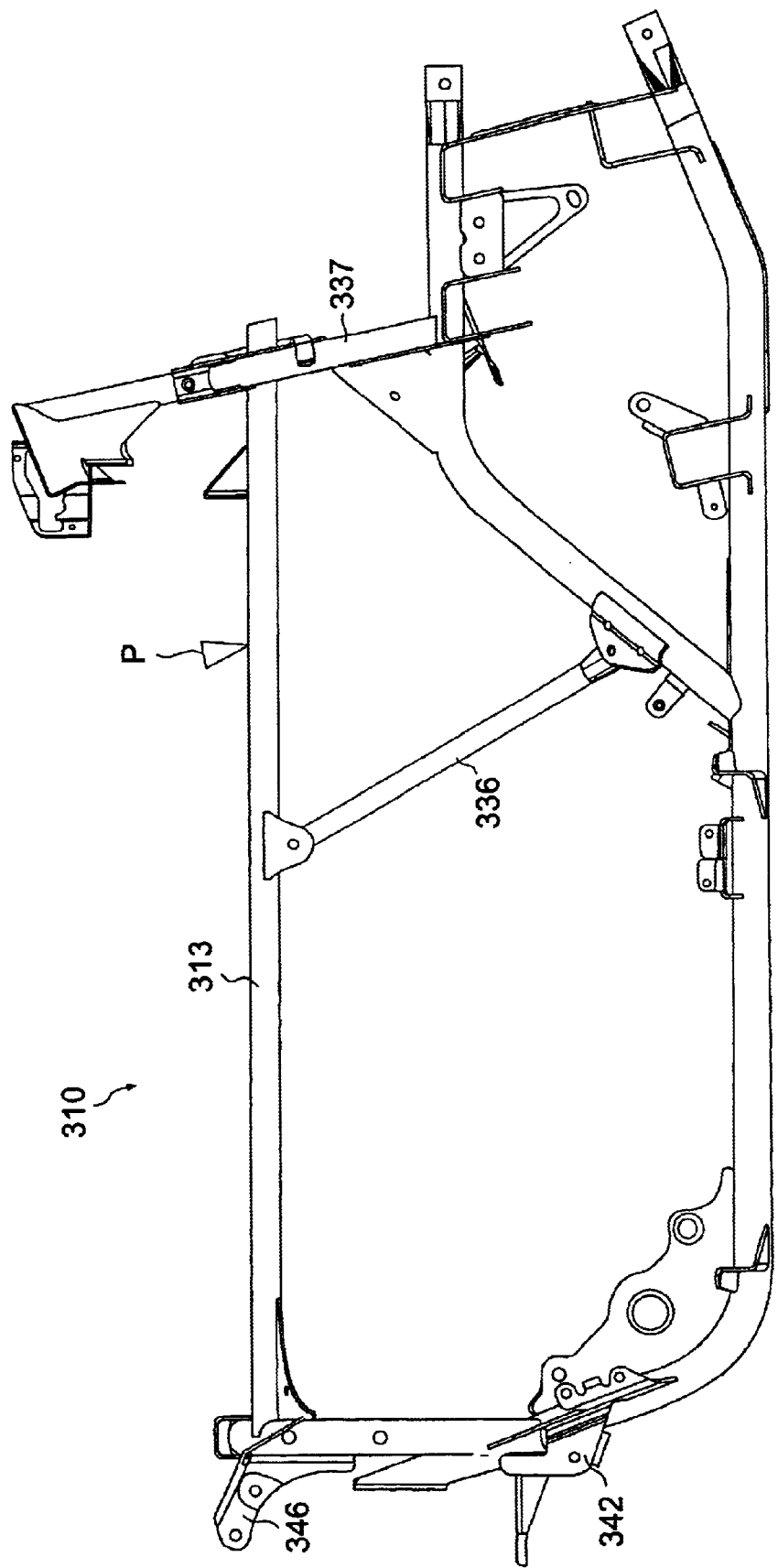
FIG. 20 is a side view of the frame illustrated in FIG. 19.

Because the engine 350 in FIG. 18 may be larger than the engine 150 in FIG. 3, the main frame 34 shown in FIG. 3 may not be suitable for supporting the engine 350. Accordingly, as shown in FIGS. 19 and 20, the main frame 310 may be constructed to be capable of supporting the engine 350 shown in FIG. 18, e.g., a four stroke engine. As with the frame 34 shown in FIG. 4, the main frame 310 includes all the attachments that are necessary to receive and accommodate the front and rear suspension arms, the front differential, steering linkage and other typical components including a front bumper. The rear area of the main frame 310 extends upwardly and terminates at two upper brackets 346 and two lower brackets 342. These brackets are for detachably supporting a secondary frame which is not shown in FIG. 19. Openings 341 are provided for pivotally attaching rear swing arms as described above in relation to FIGS. 4 and 4a. The main and secondary frame portions may be constructed from tubular or stamped members.

As compared to the frame shown on FIG. 4, the frame shown in FIGS. 19 and 20 does not include a stepped configuration. Rather, the main frame 310 includes upper members 313 that extend substantially horizontally across from a portion of the frame 310 that supports the seat 302. The construction of the frame 310 in this manner provides for more space to accommodate for the added size of the power unit 350. Also, while the height h in FIG. 18 is reduced in comparison to the height h shown in FIG. 3, the reduced height also provides the ATV 300 with a more sturdy appearance. Similarly, as with the embodiment shown in FIG. 3, the embodiment shown in FIGS. 18–21 will allow for easier access to the seat 302, such as after mounting or dismounting the vehicle. Furthermore, the open area 306 also allows for the positions of an extra storage container or larger/auxiliary fuel tank above cover member 312.

Figure 21:
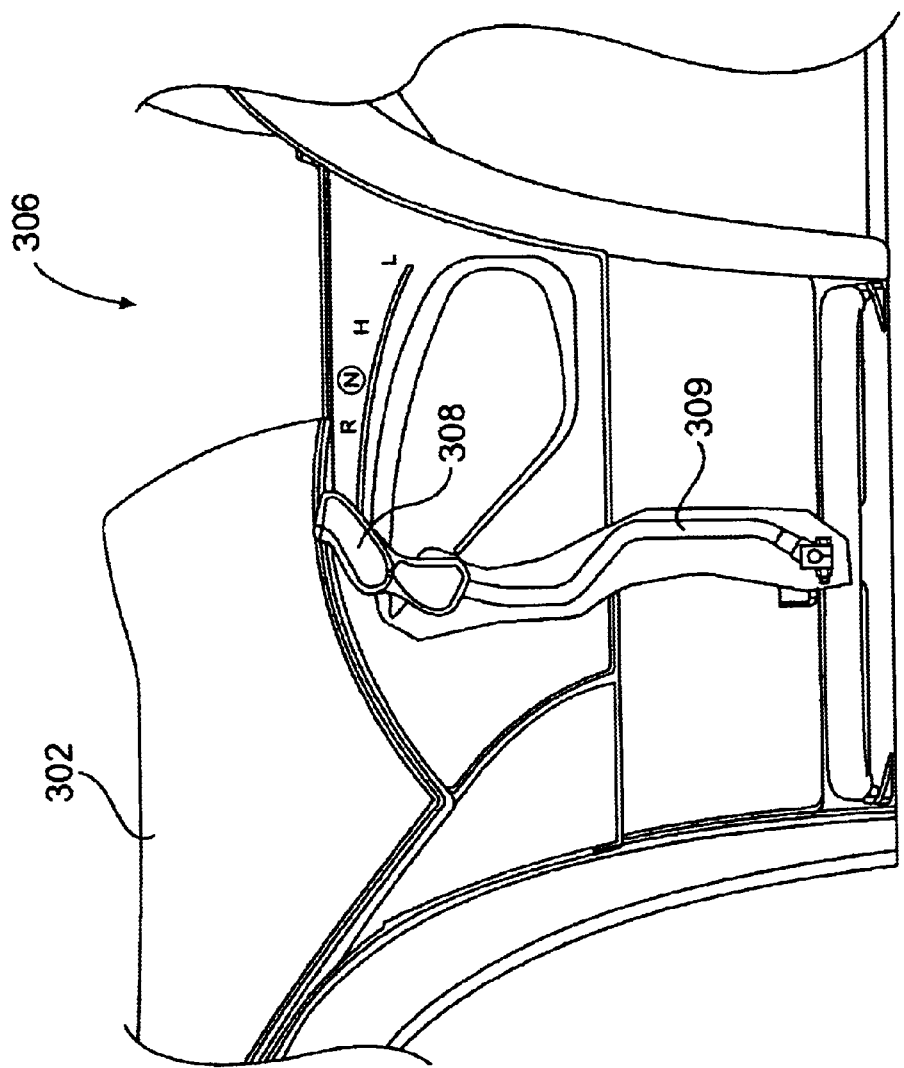
FIG. 21 is a perspective view of a hand shifter for the vehicle illustrated in FIG. 18.

FIG. 21 illustrates a hand shifter 308 that is positioned, for example, on the right side of the seat 302. Like the shifter 212 shown in FIGS. 2, 6 and 14, the shifter 308 is capable of shifting the transmission of the engine 350 into several different driving modes, e.g., Park, Neutral, High, Low or Reverse. The distance from the shifter 308 to the power unit 350 is shorter than the distance from the shifter 212 of the power unit 150 in the FIG. 3 embodiment. Thus, the linkage from the shifter 308 to the transmission of the engine 350 can be simplified, thereby helping to reduce the effort required to shift gears.

Furthermore, the shifter 308 may be connected directly to the transmission of the power unit 350 using a single link member 309. Also, as shown in FIG. 20, which is a right side view in the frame 310, the shifter 308 is positioned at a point P on the main frame 310. As described above, positioning of the shifter 308 in position P on the frame 310 is advantageous because of the reduced distance from the engine 350, as compared with the shifter 212 of FIGS. 2, 6 and 14, which is mounted near the fuel tank 311 and steering column of the ATV.

The above description of preferred embodiments should not be interpreted in any limiting manner since variations and refinements are possible which are within the spirit and scope of the present invention.

What is claimed is:

1. An all terrain vehicle comprising:
   a frame;
   a pair of front wheels suspended from a front portion of said frame defining a first transverse axis;
   a pair of rear wheels suspended from a rear portion of said frame defining a second transverse axis;
   a power unit mounted on said frame on a medial transverse axis located between the first and second transverse axes, said power unit being operatively coupled to at least one of said front and rear wheels to transmit power thereto;
   a seat constructed and arranged to be straddled by a rider, the seat being located between said front and rear pairs of wheels, wherein a main portion of said power unit is disposed beneath said seat and rearwardly of a front portion of said seat and a peripheral portion of the power unit is disposed forward of the front portion of said seat and below a horizontal plane defined by an uppermost portion of the seat; and
   an open area defined between the uppermost portion of the seat and a portion of the frame forward of the seat where the peripheral portion of the power unit is located,
   wherein a lowermost portion of the open area is positioned lower than an uppermost portion of front fenders.

2. The vehicle of claim 1, further comprising a transmission, wherein a main portion of said transmission is disposed beneath said seat.

3. The vehicle of claim 2, wherein the transmission is a continuously variable transmission.

4. The vehicle of claim 1, wherein said power unit comprises a crankshaft and a transmission shaft extending in a longitudinal direction of said vehicle transversely to the first and second transverse axes, and wherein a rear drive shaft is connected between said transmission shaft and a rear differential to transmit power to said pair of rear wheels.

5. The vehicle of claim 4, further comprising a front drive shaft connected between said transmission shaft and a front differential to transmit power to said pair of front wheels.

6. The vehicle of claim 4, wherein said seat comprises a pommel located at a front portion thereof.

7. The vehicle of claim 1, wherein power is transmitted to at least one of said front and rear pairs of wheels through a drive chain and sprocket arrangement.

8. The vehicle of claim 1, wherein said seat is pivotably connected to said frame, said seat being moveable between a first position whereby the driver may drive the vehicle and a second position whereby the driver may access the power unit.

9. The vehicle of claim 1, wherein said seat is removably connected to said frame.

10. The vehicle of claim 1, wherein the front portion of the seat defines a forwardmost surface of the seat.

11. The vehicle of claim 1, wherein a height of the open area is no more than about 50% of a seat height measured as a distance between the horizontal plane of the seat and a plane defined by a foot rest on the vehicle.

12. The vehicle of claim 1, wherein the power unit is a four stroke engine.

13. An all terrain vehicle comprising:
a frame;
a pair of front wheels suspended from a front portion of said frame defining a first transverse axis;
a pair of rear wheels suspended from a rear portion of said frame defining a second transverse axis;
a power unit mounted on said frame on a medial transverse axis located between the first and second transverse axes, said power unit being operatively coupled to at least one of said front and rear wheels to transmit power thereto;
a seat constructed and arranged to be straddled by a rider, the seat being located between said front and rear pairs of wheels, wherein a main portion of said power unit is disposed beneath said seat and rearwardly of a front portion of said seat and a peripheral portion of the power unit is disposed forward of the front portion of said seat and below a horizontal plane defined by an uppermost portion of the seat; and
an open area defined between the uppermost portion of the seat and a portion of the frame forward of the seat where the peripheral portion of the power unit is located,
wherein a height of the open area is about ¼ to about ⅓ of a seat height measured as a distance between the horizontal plane of the seat and a plane defined by a foot rest on the vehicle.

14. An all terrain vehicle comprising:
a frame;
a pair of front wheels suspended from a front portion of said frame defining a first transverse axis;
a pair of rear wheels suspended from a rear portion of said frame defining a second transverse axis;
a steering member connected to a steering mechanism for steering said front wheels;
a seat located in between said front and rear pairs of wheels, the seat being constructed and arranged to be straddled by a rider;
a power unit mounted on said frame and having a first portion thereof being disposed beneath said seat, the power unit being disposed at a medial transverse axis located between the first and second transverse axes, said power unit being operatively coupled to at least one of said front and rear pairs of wheels to transmit power thereto;
a fuel tank located beneath said steering member; and
an open area located between said fuel tank and said power unit, said open area facilitating access to and from said vehicle, a second portion of said power unit spanning at least a portion of a width of the open area.

15. The vehicle of claim 14, further comprising a transmission, wherein a main portion of the transmission is disposed beneath the seat.

16. The vehicle of claim 15, wherein the transmission is a continuously variable transmission.

17. The vehicle of claim 14, further comprising a storage container removably secured in said open area.

18. The vehicle of claim 17, wherein said storage container is an additional fuel tank.

19. The vehicle of claim 14, wherein the power unit is a four stroke engine.

20. The vehicle of claim 14, wherein a lowermost portion of the open area is positioned lower than an uppermost portion of front fenders.

21. The vehicle of claim 14, wherein a lowermost portion of the open area is positioned lower than an uppermost portion of the pair of front wheels.

22. The vehicle of claim 14, wherein a lowermost portion of the open area extends below an uppermost portion of the power unit.

23. An all terrain vehicle comprising:
a frame;
a pair of front wheels suspended from a front portion of said frame defining a first transverse axis;
a pair of rear wheels suspended from a rear portion of said frame defining a second transverse axis;
a steering member connected to a steering mechanism for steering said front wheels;
a seat located between said front and rear pairs of wheels, the seat being constructed and arranged to be straddled by a rider;
a power unit mounted on said frame and having a main portion being disposed beneath said seat and a peripheral portion being disposed forward of the seat;
a fuel tank located beneath said steering member;
a transmission transmitting power from the power unit to at least one of said front and rear wheels; and
an open area located above the peripheral portion of the power unit and between said fuel tank and said main portion of said power unit, said open area facilitating access to and from said vehicle.

24. The vehicle of claim 23, further comprising a storage compartment located forward of said steering member.

25. The vehicle of claim 23, wherein the power unit is a four stroke engine.

26. The vehicle of claim 23, wherein a lowermost portion of the open area is positioned lower than an uppermost portion of front fenders.

27. The vehicle of claim 23, wherein a lowermost portion of the open area is positioned lower than an uppermost portion of the pair of front wheels.

28. The vehicle of claim 23, wherein a lowermost portion of the open area extends below an uppermost portion of the power unit.

29. An all terrain vehicle, comprising:
a frame;
a pair of front wheels including first and second wheels suspended from a front portion of said frame, said first and second wheels defining a first transverse axis;
a pair of rear wheels including third and fourth wheels suspended from a rear portion of said frame, said third and fourth wheels defining a second transverse axis;
a power unit mounted on said frame at a medial transverse axis located between the first and second transverse axes;

a transmission transmitting power from the power unit to at least one of said front and rear pairs of wheels;

a seat located between said front and rear pairs of wheels, wherein a main portion of said power unit is located between said second transverse axis and the medial transverse axis, wherein a main portion of said fuel tank extends generally vertically and is disposed substantially below a horizontal plane defined by the uppermost portion of said seat; and an open area located above a peripheral portion of the power unit and between said fuel tank and said power unit, said open area facilitating access to and from said vehicle.

30. The vehicle of claim 29, wherein a height of the open area is no more than about 50% of a seat height measured as a distance between the horizontal plane of the seat and a plane defined by a foot rest of the vehicle.

31. The vehicle of claim 30, wherein the height of the open space is about ¼ to about ⅓ of the seat height.

32. The vehicle of claim 29, wherein the power unit is a four stroke engine.

33. The vehicle of claim 29, wherein a lowermost portion of the open area is positioned lower than an uppermost portion of front fenders.

34. The vehicle of claim 29, a lowermost portion of the open area is positioned lower than an uppermost portion of the pair of front wheels.

35. The vehicle of claim 29, wherein a lowermost portion of the open area extends below an uppermost portion of the power unit.

36. An all terrain vehicle comprising:

a frame;

a pair of front wheels supported by a portion of the frame defining a first transverse axis;

a pair of rear wheels supported by a portion of the frame defining a second transverse axis;

a power unit mounted on the frame at a medial transverse axis located between the first and second transverse axes; and a transmission coupled between the power unit and at one of the front and rear wheels to transmit power from the power unit at least to one of the front and rear wheels;

a seat mounted on the frame generally above the power unit, the seat being constructed and arranged to be straddled by a rider;

a plurality of foot rests supported by the frame generally below the seat;

a steering assembly supported by the frame and coupled to the front wheels to steer the vehicle, wherein an open area is defined between the seat and the steering assembly, the open area having a height less than a distance between the seat and the foot rests; and a gas tank supported by the frame and disposed between the steering assembly and the seat, wherein a portion of at least one of the power unit, and the transmission is disposed beneath the open area.

37. The vehicle of claim 36, wherein the power unit is a four stroke engine.

38. The vehicle of claim 36, wherein the transmission is a continuously variable transmission.

39. The vehicle of claim 36, further comprising a radiator supported by the frame behind the seat.

40. The vehicle of claim 36, wherein a lowermost portion of the open area is positioned lower than an uppermost portion of front fenders.

41. The vehicle of claim 36, wherein a lowermost portion of the open area is positioned lower than an uppermost portion of the pair of front wheels.

42. The vehicle of claim 36, wherein a lowermost portion of the open area extends below an uppermost portion of the power unit.

43. An all terrain vehicle comprising:

a frame;

a pair of front wheels suspended from a front portion of said frame defining a first transverse axis;

a pair of rear wheels suspended from a rear portion of said frame defining a second transverse axis;

a power unit mounted on said frame on a medial transverse axis located between the first and second transverse axes, said power unit being operatively coupled to at least one of said front and rear wheels to transmit power thereto;

a seat constructed and arranged to be straddled by a rider, the seat being located between said front and rear pairs of wheels, wherein a main portion of said power unit is disposed beneath said seat and rearwardly of a front portion of said seat and a peripheral portion of the power unit is disposed forward of the front portion of said seat and below a horizontal plane defined by an uppermost portion of the seat; and an open area defined between the uppermost portion of the seat and a portion of the frame forward of the seat where the peripheral portion of the power unit is located, wherein a lowermost portion of the open area is positioned lower than an uppermost portion of the pair of front wheels.

44. An all terrain vehicle comprising:

a frame;

a pair of front wheels suspended from a front portion of said frame defining a first transverse axis;

a pair of rear wheels suspended from a rear portion of said frame defining a second transverse axis;

a power unit mounted on said frame on a medial transverse axis located between the first and second transverse axes, said power unit being operatively coupled to at least one of said front and rear wheels to transmit power thereto;

a seat constructed and arranged to be straddled by a rider, the seat being located between said front and rear pairs of wheels, wherein a main portion of said power unit is disposed beneath said seat and rearwardly of a front portion of said seat and a peripheral portion of the power unit is disposed forward of the front portion of said seat and below a horizontal plane defined by an uppermost portion of the seat; and an open area defined between the uppermost portion of the seat and a portion of the frame forward of the seat where the peripheral portion of the power unit is located, wherein a lowermost portion of the open area extends below an uppermost portion of the power unit.

* * * * *